US005840153A

United States Patent [19]

Sieber

[11] Patent Number: 5,840,153

[45] Date of Patent: Nov. 24, 1998

[54] TRANSFER SHEET ASSEMBLY FOR WRAP AROUND DESIGN AND METHOD FOR MAKING AND USING

[76] Inventor: Robert Sieber, 11 Gray Road Box 2249, Braubridge, Ontario, Canada

[21] Appl. No.: 266,938

[22] Filed: Jun. 27, 1994

Related U.S. Application Data

[62] Division of Ser. No. 019,461, Feb. 18, 1993, Pat. No. 5,324,378.

[51] Int. Cl.[6] ........ B32B 31/00

[52] U.S. Cl. ........ 156/542; 156/63; 156/235; 428/202

[58] Field of Search ........ 156/230, 583.1, 156/234, 235, 238, 240, 289, 542, 63; 428/200, 202, 40

[56] References Cited

U.S. PATENT DOCUMENTS

| | | | |
|---|---|---|---|
| 4,089,722 | 5/1978 | Holoubek | 156/235 |
| 4,379,018 | 4/1983 | Griesdorn | 156/583.1 X |
| 5,252,166 | 10/1993 | Krawczyk | 156/63 X |

*Primary Examiner*—James Engel
*Attorney, Agent, or Firm*—Charles A. Wilkinson

[57] ABSTRACT

A two-step press type transfer operation is made practical by a particular rendering of pictorializations for use upon the transfer sheets. A pictorialization should have a major portion of some object in the center of the pictorialization or a portion of a pictorialization in which a segmentation or division of such pictorialization is to be made so that one portion of the pictorialization may be placed upon one transfer sheet and a second portion of the pictorialization placed upon a second transfer sheet. Substantial straight linear portions of such pictorialization of this area are avoided and the division between the two portion of the image are run along nonlinear borders upon the edge of clearly defined structures within the pictorialization. A translucent flap is also maintained on the edge of the transfer sheet so that upon placing a second transfer sheet over a first pictorialization already applied to a garment or the like, the flap protects the underlying pictorialization from damage by the hot press. The invention allows "seamless" or "wrap around" pictorializations to be applied to garments using presses which are otherwise too small to press the entire transfer sheet at one time.

5 Claims, 3 Drawing Sheets

TRANSFER SHEET ASSEMBLY FOR WRAP AROUND DESIGN AND METHOD FOR MAKING AND USING

RELATED APPLICATION

This application is a division of U.S. application Ser. No. 08/019,461 filed Feb. 18, 1993 now U.S. Pat. No. 5,324,378, from which priority is claimed.

BACKGROUND OF THE INVENTION (1) Field of the Invention.

This invention relates generally to the field of heat transferable or pressure transferable pattern sheets for use in placing pictorial and design patterns on fabrics and particularly clothing and the like. More particularly, this invention relates to a multi-part transfer sheet by which a so-called "wrap around" or wide "seamless" pattern can be placed upon clothing at the point of sale.

(2) Description of the Prior Art.

In general, heat transfer printing involves the use of a so-called transfer sheet having a pictorial or other design representation on the surface rendered in dyes or coloring which are either sublimatic or meltable. Early transfer sheets used printing materials or dyes solid at room temperature, but meltable with the application of heat within the range of 150° to 250° C. so that the transfer sheet could be heated with an iron or the like while pressed against a fabric such as a so-called t-shirt or sweat shirt to transfer the pattern to the fabric from the transfer sheet. Early transfer printing involved frequently the use of a damp cloth or the like placed either upon the transfer or the fabric to form steam when heat was applied to aid in carrying the coloring material or dye into the cloth. Sublimable dyes and printing inks were soon developed, however, which generally superseded the use of steam to draw the coloring matter into the fibers of the fabric.

The transfer sheet is made by initially printing the dyes in a desired pattern on the transfer sheet. Such sheet is usually formed of a stiff paper sheet composition, the pattern being printed in a mirror image of the desired pattern to be applied later to the fabric surface. The transfer sheet is readily handled and shipped without smudging or deterioration and can be stored for long periods until needed without deterioration so long as it is not heated.

There are three broad types of apparatus and processes for applying transfer sheet patterns to fabrics. In one of these the fabric, such as t-shirt or a sweat shirt or the like, is laid out on a flat surface and the transfer sheet is laid upon the fabric in the position at which the pattern is to be applied, after which a hot iron is passed over the surface of the transfer sheet to activate the inks of the transfer sheet and transfer them to the fabric. Alternatively, the transfer sheet may be laid upon the flat surface and the fabric laid over it after which a heated iron is applied to the surface of the fabric. Either one of these procedures are strictly hand operations and are consequently labor intensive and the results may be of variable quality and low satisfaction. However, the process is adaptable and flexible and can be used with a minimum of equipment. The process is usable with various sized transfer sheets, but the quality over a broad expanse of material may be non-uniform and therefore less than desirable.

A second broad type of apparatus commonly employed in heat transfer printing is a flat heated press somewhat like a press for pressing fabrics. Such presses are relatively inexpensive and come in several sizes, of which the most common are 20×20 inches or 16×20 inches. These presses partially mechanize the transfer process, since, although they are customarily operated by hand, they print or press an entire transfer sheet at one time and generally provide a uniform quality product. Such presses also have the considerable advantage of being cheap and readily usable by unskilled labor so that almost every novelty or clothing establishment can have or afford one. As a consequence, a shop having a press, plus a supply of a variety of transfer sheets with a variety of pictorial representations upon them can maintain only a small inventory of uniform clothing items such as plain white t-shirts in several sizes, yet can sell such t-shirts with a wide variety of pictorial or design patterns upon them by merely transferring various patterns to their surface from a supply or inventory of various transfer sheets using the transfer heat press process as customers order various designs or pictorial representations from the small inventory of actual clothing items. A small establishment with a limited budget may, therefore, provide to its customers as broad a line or selection of patterned shirts or other clothing as can a much larger establishment which vends ready made or machine transfer printed clothing requiring a much larger inventory of clothing items. Thus, while the procedure of opening the press, laying the garment in the press, laying the printed heat transfer sheet upon the garment, closing the flat plate of the press upon the transfer and the garment, allowing heat to soak into the transfer and garment (taking from a fraction of a minute to several minutes depending upon the transfer materials) to effect transfer of the pattern from the transfer to the garment, and opening the press and removing the printed garment, is discontinuous, time consuming, laborious and generally costly, it does have the considerable advantage of being less capital or inventory intensive than the more mechanical continuous transfer printing process.

The third type of prior art heat transfer printing uses basically a heated roller with a continuous roll of transfer sheet material and a continuous roll of fabric material which are rapidly fed to the printing apparatus in face to face relationship. The entire apparatus comprises a series of rollers, including the heated roller against which the transfer sheet material may be pressed together with the fabric by a third sheet-like material referred to as an "endless blanket" or backing material. Other arrangements for such machine-type printing have also been used, generally involving the use of a continuous transfer sheet material which during the operation is pressed while heated against the material to be printed to transfer the desired pattern. Such processes are relatively fast, accurate and capital intensive rather labor intensive. Such apparatus and processes are, therefore, suitable for high productions of identical products in an industrial or semi-industrial setting.

The common transfer printing operation using a press such as found in small shops or, not infrequently, in large shops where it is desired to limit inventory, is as indicated above, usually limited to a 20×20 or 16×20 inch or smaller field due to the limited size of presses available in most establishments. Large presses can be obtained, but being more capital intensive and not significantly faster and not providing significantly better quality, are not popular. Rather than purchasing a larger press for larger sized transfer, it may be more economical to purchase or maintain an increased inventory of machine transfer printed materials. In some cases, furthermore, it has been possible to print adjoining pictorial material on the same garment by multiple use of the same press. For example, if pictorial material is to be transferred to both the back and front of a garment, the garment can be transfer printed consecutively in the same press. Unfortunately, it has not been possible in most cases to register or to bring adjoining pictorial representations together as a unit, i.e. print larger pictorial representations in two separate steps, because of a visible seam or line either in the form of an open space or gap across the pictorial representation or in the form of a darker line visible at the registration or merging point due to overlap both due to transverse misalignment or of a visible demarcation in the form of a slight vertical or longitudinal misalignment. very small misalignments of mere fractions of a millimeter may become highly visible because of cumulative visual cues. While a machine transfer printing process, furthermore, may be able to counteract such misalignments by accurate operation of the machinery and transfer process, such extreme accuracy is not possible in the manual use of an ordinary transfer press. Contiguous use of the hot press on adjacent portions of the final design have also tended to cause blurring and distortion of the pictorial design.

In recent years so-called "seamless" or "wrap-around" designs have become quite popular. These are designs which extend from arm pit to arm pit on a t-shirt or a sweat shirt. Such designs are nominally twenty-six inches across and cannot, therefore, be fitted into the usually available size of press. All such "seamless" designs have had, therefore, to be machine printed or machine transfer printed and have not been producible on the premises of most shops unless such shop could afford the more complicated machine printing apparatus or a larger manual press which larger press is not usually economically viable compared to stocking additional inventory for most establishments. Attempts have been made to produce the seamless designs in two steps with the usual press equipment. However, the seam or delineation border has always been visible between the two parts in the final product.

The present inventor has discovered that it is possible to produce such seamless designs by use of the usual sized presses by the use of a novel two section or multipartite transfer sheet or sheets carefully made to de-emphasize the connection or registration point between the designs and provided with a heat shield to protect the first applied design representation from the second press operation. Such two-part transfer can be quickly and easily made in the usual shop having a conventional press. This enables the average sales establishment that relies upon on-site press type transfer operations, in order to reduce any necessary inventory, to provide "seamless" or "wrap-around" designs on fabrics and particularly on t-shirts, sweat shirts and the like. The press can, of course, also apply the more traditional sized transfer designs.

OBJECTS OF THE INVENTION

It is an object of the invention, therefore, to provide a method of providing high-quality "seamless" or wrap-around designs by the use of the usual on-site press.

It is a further object of the invention to provide a transfer sheet or sheets that can be used consecutively in the usual on-site press to provide "seamless" or "wrap-around" transfer designs.

It is a still further object of the invention to provide a method of providing a multipartite transfer sheet that produces two sections of a single sheet that can be easily aligned together by unskilled persons with no mechanical aids to produce a seamless or wrap around pictorial representation.

It is a still further object of the invention to provide a multipartite transfer sheet having an overall pictorial representation divided in such a way that the two sections are related to each other along a border or registration having a minimum of straight sections and which closely corresponds with already present divisions or edges present in the pictorial representation.

It is a still further object of the invention to provide a multipartite transfer sheet having pictorial representations including detailed pictorial elements extending across the major portion of the colored pictorial field which pictorial elements have discrete outlines with a minimum of straight segments along which the pictorial representations can be conveniently segmented.

It is a still further object of the invention to provide a multipartite transfer sheet in which one part at least is substantially translucent and is provided with a flap extending from the edge of a segmented pictorial representation in a position to at least partially cover the remainder of the segmented pictorial representation already transferred to the surface of an article of clothing.

It is a still further object of the invention to provide a multipartite transfer sheet having a heat insulating protective flap on a side arranged and constructed to be aligned against a pictorial representation already transferred to a base fabric item.

It is a still further object of the invention to provide a multipartite transfer sheet having a pictorial representation upon the surface rendered in transfer printing materials and having such pictorial representation extending completely across at least the color printed portion of the transfer sheet, said transfer sheet being divided into two portions along a line passing along natural boundaries or edges of the pictorial representation without any substantial straight linear portion and having at least one segmented portion of said transfer sheet constructed of a substantially at least translucent material and incorporating a flap extending from the side of the material along the segmented pictorial representation.

It is a still further object of the invention to provide a method of making and using a multipartite transfer sheet comprising providing a pictorial representation having dimensions along an internal portion calculated to be substantially at the center of a transfer image that extends substantially across the entire pictorial field and along which the image can be segmented with a minimum of straight or linear sections and along well defined borders of subject matter within such pictorial representation, segmenting said pictorial representation along a dividing line passing along said design elements and placing one portion of said pictorial representation on a first transfer sheet and another portion of said pictorial representation on a second transfer sheet at least one of said transfer sheets having a flap of at least translucent material extending from the segmented edge of said pictorial representation, said flap being of a material and thickness that will effectively heat insulate a pictorial representation placed upon a fabric, heat pressing the one transfer sheet in a press upon a clothing garment on one side of said garment to transfer the pictorial representation to the garment and aligning or registering the pictorial representation on the other transfer sheet with the pictorial representation transferred to said garment along the segmented division with the translucent heat insulating flap over the representation transferred to the garment and heat pressing the other transfer sheet to transfer its pictorial representation to said garment in such fashion as to show no visible seam to the naked eye.

It is a still further object of the invention to provide a multipartite transfer sheet that will enable wide "seamless" pictorial design representations larger than the heat press or ironing press available for heating and pressing said transfer to be made in standard size transfer presses in a two-step operation.

Other objects and advantages of the invention will become evident from review of the following description and explanation in connection with the attached drawings.

SUMMARY OF THE INVENTION

It has been discovered that so-called "seamless" or "wrap-around" designs, i.e. wide designs extending from armpit to armpit on clothes or shirts and the like can be formed using the usually available heat presses normally used for transfer application. The invention involves special rendition of the pictorial representations such that the representation extends across the entire width of such wrap around with a portion of the design extending across a major portion of the representation at a point, usually at or near the center, in which portion the representation can be segmented or divided along a border having a minimum of linear or straight portions and in which the segmentation or border can be made or directed along naturally occurring borders of objects within such representation. The two segmented sections of the pictorial representation are then separately printed or otherwise reproduced upon the surface of two separate transfer sheets, one of which has an at least partially transparent flap extending outwardly from the segmented border between the two portions of the representation. In effecting transfer of the pictorial representation from the transfer sheets to the article of clothing the transfer sheet that is not provided with the transparent heat insulating flaps, if only one is present between the two transfer sheets, is first heat pressed upon the fabric within an ironing press to transfer its pictorialization to the fabric and the other transfer sheet with the translucent heat insulating flap is then aligned with the first heat transfer on the clothing so that the two portions of the pictorial representation at least approximately match and the second portion of the pictorial representation is transferred to the article of clothing with the first section protected from heat softening or other damage by the insulating flap to prevent heat softening or blurring or other damage to serial first portion of the representation. The second transfer sheet pictorialization is aligned with the first pictorialization already imprinted upon the fabric by holding the translucent flap close to the fabric surface and sighting through such flap. Because of the provision of a major design element of the pictorialization extending over the major portion of the transfer sheet at the point where a division or segmentation is to be made and wherein the division or dividing line or segmentation of the figure is made along natural boundaries of the representation of objects within said pictorialization avoiding the creation of any substantial straight or linear sections and wherein the path of the segmentation follows a generally jigsaw-type of pattern along the border of actual structures in said pictorialization it has been found that a very adequate alignment or registration of the two parts or portions of said pictorialization can be manually obtained in which any minor misalignments are not obvious or visible to the naked eye, unless specific attention is drawn to them. The special pictorial representation, in other words, if correctly done, is effective to mask any alignment discrepancies which would be clearly evident if viewed with the naked eye along a straight boundary or segmentation division.

DESCRIPTION OF THE PREFERRED EMBODIMENTS

Figure 2:
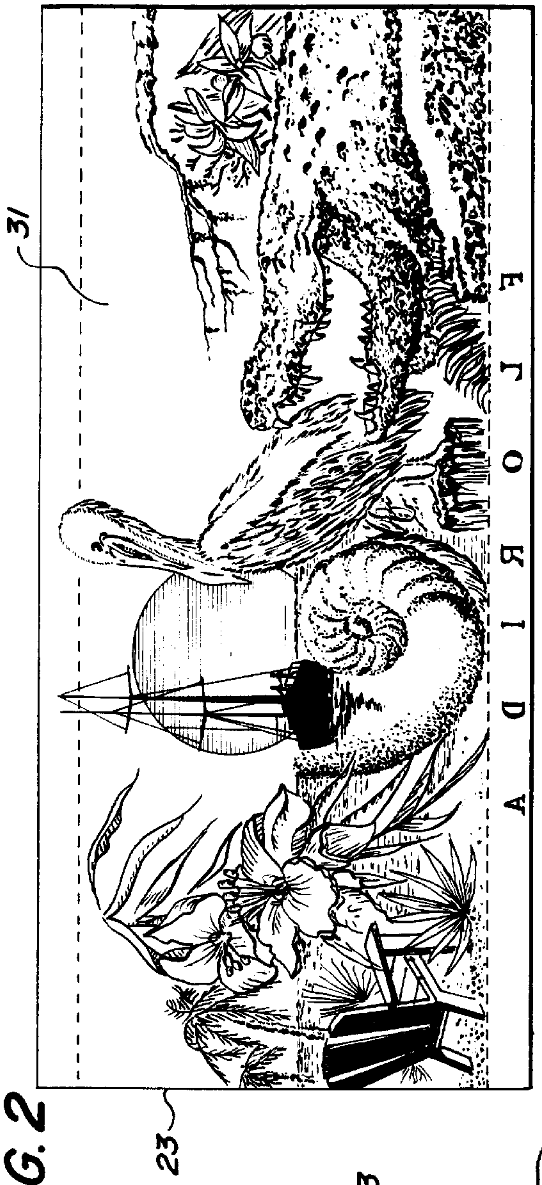
FIG. 2 is a view of a relatively simple drawing or pictorial representation suitable for segmentation onto two separate transfer sheets in accordance with the invention.

There is a large market for hand press applied transfer printing to garments such as T-shirts and sweat shirts, because small shops as well as even larger establishments can, by carrying out such hand press transfer printing on their premises, stock a variety of relatively cheap transfer sheets having various pictorial and design representation on thin surfaces for application on the premises to a relatively small stock, or inventory, of standard clothing items which are relatively more expensive. Thus a shop might, for example, stock several dozen white T-shirts in four or possibly five sizes, each without any regular decoration, plus several hundred or even thousands of transfer sheets with various pictorial representations on their surfaces. When a customer requests a T-shirt with a particular pictorial decoration, this can be supplied within a few minutes with a minimum of labor by using relatively unskilled employees or even the normal sales personnel who may, in fact, have little else to do between customers, by merely heat pressing the appropriate cheap and easy to store transfer sheet with a desired pictorialization upon a T-shirt in the heat press. Otherwise, the shop might have to stock an entire inventory of T-shirts already provided with the appropriate pictorial representation at a considerable inventory cost as well as additional storage space and the like.

While the use of on premises heating presses to provide on the spot pictorial and design representations on T-shirts and other garments is thus very convenient and economical, particularly to small shops, there have been in recent years and increasing number of so-called "seamless" or "wrap around" designs for clothing that have not been fabricatable or transferable in a single heat press in the average shop, not because such press could not be made, but because the large size press required is not available in most shops where relatively small presses of 20×20 inches and 16×20 inches have become the standard. Such presses require large pictorial and other design representations to be applied in two stages or two pressing operations for adjoining portions of the representation. This can be accomplished by applying two transfer shirts beside each other in consecutive operations with the press or in two pressing operations upon an extra wide transfer sheet. Unfortunately, when using two matching transfer sheets in which the pictorial representation extends from one sheet to the other, it has been found to be next to impossible to match up or register the two transfers so that a visible seam is not left between the two sections of pictorial representation, either in the form of a gap or of a dark line due to overlapping or of a vertical misalignment which becomes very evident over a length even though the misalignment may be very small.

If an extra large transfer sheet is used with two separate closures of the heated press, on the other hand, misalignment of the press is almost inevitable so that either a gap is left where the transfer is not heated to transfer its image, or a dark line appears where an overlap of the two press closings may have occurred. Thus it has been found almost impossible to provide satisfactory alignment either of two section of a single pictorial representation or two closures of a press over an elongated or lengthened transfer sheet. Since the heated press process is inherently a hand or manual type operation, it is almost impossible to obtain close alignment or at least sufficiently close alignment so that such misalignment will not be readily visible causing an undesirable condition such as usually a very visible seam in the center of the pictorial representation.

The present inventor has found that these undesirable results can be alleviated in a consecutive press operation and the visible seams effectively eliminated, if, instead of attempting to eliminate very small misalignments which are practically impossible to eliminate in any event, the pictorial representation is instead especially designed to de-emphasize any misalignment that does occur to make the alignment or registration of the transfers as close as reasonably possible in a manual operation effective to transfer a complete image or pictorialization without any noticeable seam. In order to attain such results the present applicant in accordance with the invention especially prepares the pictorial representation to have elements of such pictorial representation at the location of the prospective separation into two cooperating portions that extend substantially completely across the representation, or at least across any colored portion of said representation. Such extended pictorial representation elements should include a series of outlines of definite structures as part of the pictorial representation having outlines that are other than straight line and that allow a segregation of two portions of the representation along a varying or deviating path having a minimum of linear or straight components and following generally the outlines of the edges of the components or depicted structures of said pictorial representation. The applicant has found, that if the pictorial representation is prepared in accordance with these principals, that after the two or more portions of the pictorial representations have been severed or segregated from each other and then placed upon separate transfer sheets that after one of said portions is transferred to a garment the other may be readily brought into its vicinity and approximately aligned by eye with the first portion and the second transferred to the garment in approximated alignment with the first in an interengaging mode along the segmentation or dividing line. Thereafter, when viewed from a normal distance or even close by, the two approximately aligned or registered portions of the pictorial representation will appear to the naked eye to be merged into one pictorial representation without a seam, even though not perfectly aligned or registered. Furthermore, if there is a translucent flap extending from the edge of the second portion or transfer sheet to be affixed to the garment such flap will protect the first portions of the representation to be affixed from heat effects such as blurring and the like during transfer of the second portion of the pictorial representation. The flap which should be either substantially translucent or transparent so that it does not interfere with alignment of the two sections because the first is sighted upon the flap. The flap need only be translucent since the flap will normally be folded down in direct contact with the previously transferred image which can be readily seen through the translucent portion of the flap. Even though images become indistinct when viewed through a translucent member even a slight distance from said physical images, such images can be seen quite clearly, if brought directly against or adjacent to the translucent portion, since this minimized light scattering. It will be understood that there is nothing, furthermore, to prevent the flap and, in fact, the entire transfer sheet or the two transfer sheets from being either translucent or even transparent. However, it has been found and will be readily understood that it will be sufficient for the flap of the second or last transfer sheet to be applied to the clothing items to be translucent or even transparent.

The details of the invention will be better understood from consideration of the attached drawings as described further below in connection therewith.

Figure 1:
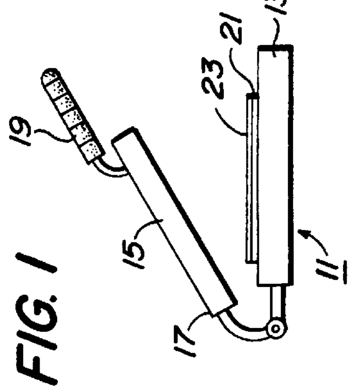
FIG. 1 is an elevation of a typical press for transferring a pictorial or design representation from a transfer sheet to an article of clothing.

In FIG. 1 there is seen an elevation of a typical transfer press 11 comprised of a lower section 13 and an upper pivoted clamping section 15 which may be electrically heated by current supplied through the leads 17. When it is desired to transfer a pictorial or other design to a clothing product, the upper clamping section 15 of the press 11 may be opened by means of the handle 19 and the clothing product 21 laid flat within the press 11 upon the lower section 13. A transfer 23 is then laid face down upon the clothing product 21 after which the pivoted upper clamping section 15 may be moved downwardly until it contacts the transfer 23. The heat of the press activates the dye material in the image upon the transfer sheet 23 which dye is in most cases sublimated into the fibers on the surface of the clothing product 21. The press is kept closed for a fraction of a second up to several minutes depending on the type of transfer ink or dye material which is being used and the press is then opened and the clothing product 21 and expended transfer 23 are removed. The clothing product can immediately be sold to a requesting customer while the transfer is discarded.

As indicated above, the presses available in most establishments are of a size within the range of 20×20 inches or 16×20 inches. Consequently, if a larger pictorial representation is to be transferred from a transfer sheet to a clothing product, such transfer must be either made by a continuous machine transfer printing process or by means of a simple ironing process where a hand iron rather than a press is used to heat and smooth the transfer. The use of an ordinary iron, however, tends to give only mediocre results, since the uniformity of ironing and particularly of heating is non-uniform, resulting in a non-uniform transfer of color material, which is highly undesirable. A larger press could also be obtained in order to press or apply the larger transfers. However, the additional investment in a larger press, the price of which tends to be considerably more than the increasing surface area of the press, is not an attractive proposition for small transfer shops. Consequently, in the past, the most practical solution has been for such shops is to carry an actual inventory of the larger transfer coated material already coated and to maintain their presses for use with the conventional smaller sizes of transfer materials.

The present inventor has discovered that a properly rendered pictorial design severed into two separate pieces along a predetermined separation or registration line can be applied to a clothing item such as a T-shirt or sweat shirt in two separate pressing operations without leaving a visible seam which would reduce the quality of the product. FIG. 2 shows an example of a properly prepared pictorial representation, in this case of a pelican standing on a dock presumably viewing a sunset or sunrise behind a sailing vessel. It will be noted that the pelican extends vertically substantially across the entire central section of the pictorial representation and that an imaginary border around the pelican has a curving configuration, or as shown, no straight or linear sections. The pelican as well as the portions of the drawing or pictorial representation below the pelican have well defined borders with a fairly complicated pictorial rendition, for example the many small feathers upon the pelicans breast, along one side of the border. All of these elements tend to divert the eye from contemplation of the exact registration of any of the portions together so that a slight misregistration is not noted. On the other hand, if the edge or border line was run straight through the drawing at any point, the many slight misregistrations along that line become cumulative to the eye which easily picks such minor misregistrations in bulk and registers them as a seam or discontinuity running across the pictorialization.

Figure 3:
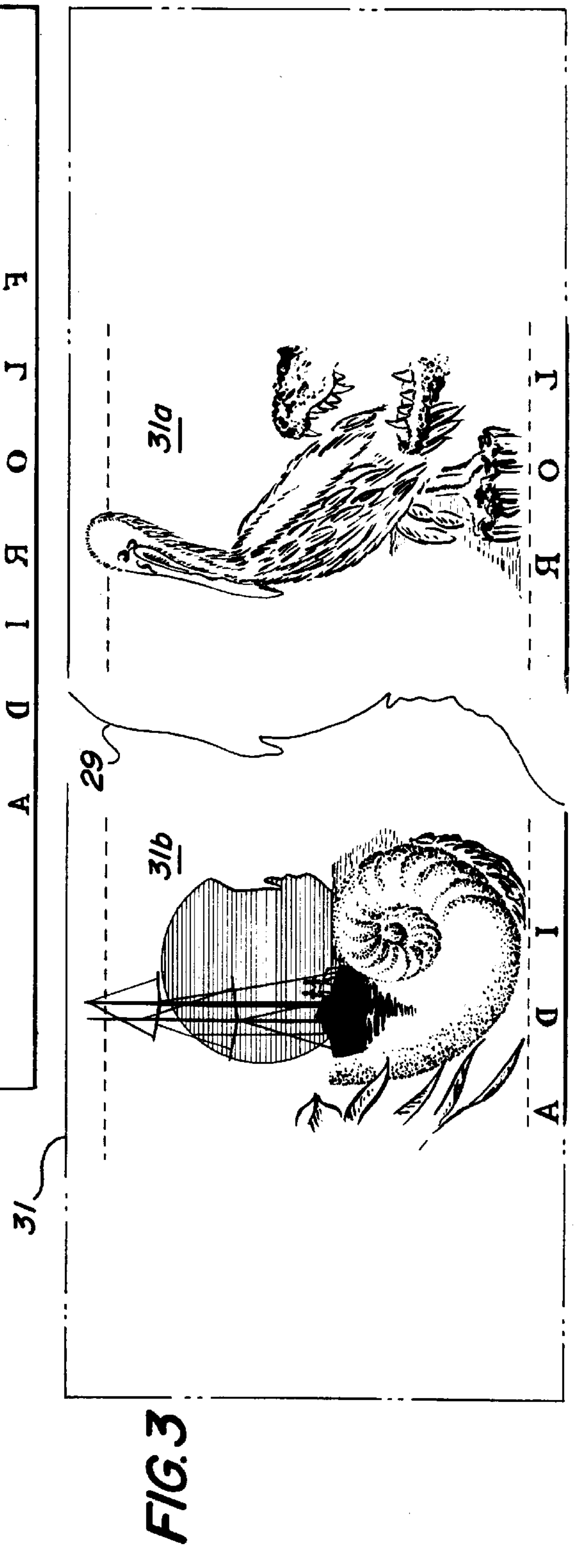
FIG. 3 is a view of the drawing of FIG. 2 segmented in accordance with the invention into two transfer sections showing a segmentation line between them for comparison.

FIG. 3 is a view of the drawing shown in FIG. 2 segmented in accordance with the invention along a line having a minimum of straight portions, and in this case actually none, and passing along the border or borders of well-defined physical structures. A segmentation line 29 which is an imaginary line following the outline of the division between the two sections 31*a* and 31*b* of the overall pictorial design 31 is shown as an imaginary line passing between the two segmented pictorial representations 31*a* and 31*b* and having basically the conformation of the edge or border of the pelican. The pictorialization or picture shown actually has a further desirable design feature, although not a necessary design feature in that it opposes to the pelican a blank more or less featureless sun image along which the human eye would normally visualize a border in any event. However, along the lower portion of the pictorialization, the detailed rendition of the edge of a shell having a fair amount of small detail is opposed to small waves and reflections in a water surface distracting the eye sufficiently along a curving line to hide small cumulations or misalignments.

Figure 4:
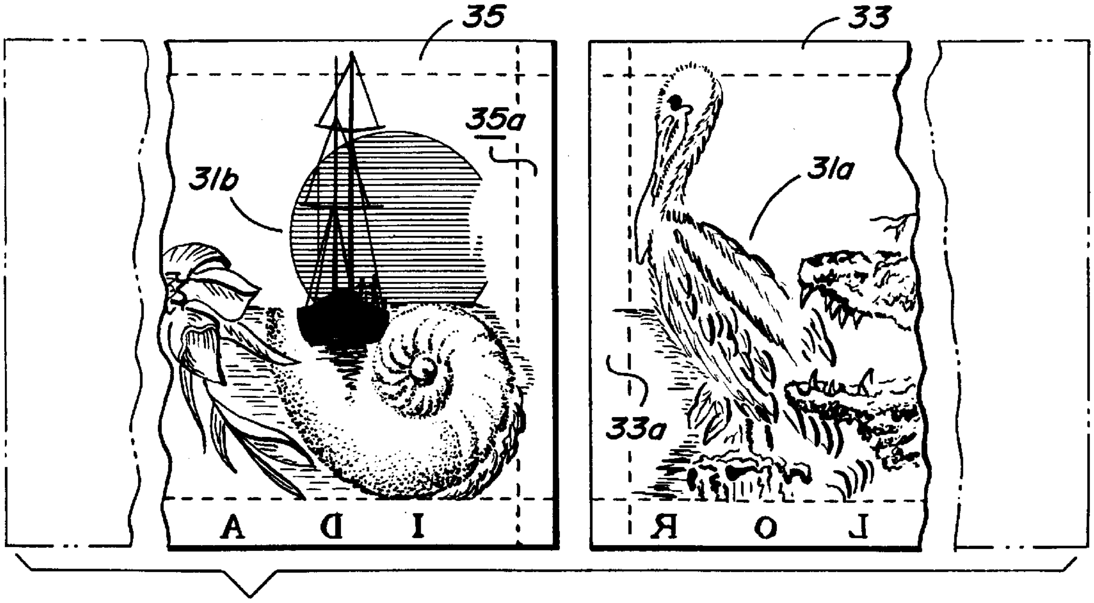
FIG. 4 is a plan view of two transfer sheets A and B with the pictorialization from FIG. 3 imprinted upon them showing in addition a translucent flap extending outwardly along one of the segmentation or registration line of each transfer sheet.

FIG. 4 is a further view of the two segments 31*a* and 31*b* of the pictorialization 31 placed upon two separate transfer sheets 33 and 35 respectively. These transfer sheets are of any suitable heavy cellulose or plastic composition. Beyond the segmentation line on either side of such transfers is a blank piece of transfer sheets 33 and 35 is shown a heat protective flap 33*a* or 35*a*. It will be understood that in transferring the two segmented images of the pictorial representation from the transfer sheets 33 and 35 to clothing article that the flap on the first transfer to be applied has no essential function other than as a border by which the transfer may be handled. However, when the second transfer is then applied in a second pressing operation to the clothing article, registering the image on the second transfer along the transfer or registration line, which is essentially the segmentation line 29, the flap extending outwardly from that side of the transfer serves to protect the surface of the already applied transfer image on the clothing from the heat of the portion of the iron extending beyond the transfer image.

In order for the two images to be reasonably registered with each other, the second portion of the image 31*b* still on the transfer sheet 35 to be reasonably registered with the first portion of the pictorialization 31*a* on the transfer sheet part 33, it is necessary for the flap 35*a* to be at least effectively translucent so that when such flap is placed close to the original image 31*a* such image will show through the translucent flap so that the second section of the pictorialization 31*b* can be substantially aligned with it. As will be understood, due to the diffraction of light waves in a more or less random manner in a translucent section of material, good images cannot be seen through the material when they are a slight distance from the original pictorialization. However, if such material and in this case the flap is brought down tightly upon the surface of the first portion of the image on the clothing, such image will be readily visible through the translucent material, since all light rays tend to be traveling in nearly the same direction as they pass through the thin piece of translucent material and tend to be refracted similarly. While it will be impossible to exactly register the two pictorial images, it will be found that they can be sufficiently accurately registered with each other so that when the original image has been adequately rendered, no substantial straight or linear portions of the intersection or registration of the two images is present and where such registration runs along well defined borders of objects within the pictorialization any misregistration of a minor nature is sufficiently broken up so that it will not be noticed by the naked eye. As a consequence, the overall pictorialization may be applied to the fabric article such as a T-shirt or sweat shirt in the press in two separate pressing operations and even though the registration is not perfect, no seam or segmentation line between the two portions of the pictorialization will be noticeable. The transfer itself may have a dotted center line and several dotted horizontal lines on the off side to aid in lining up in the actual press, but these lines are for major alignment in the press and do not aid the alignment of the two pictorializations together.

Figure 5:
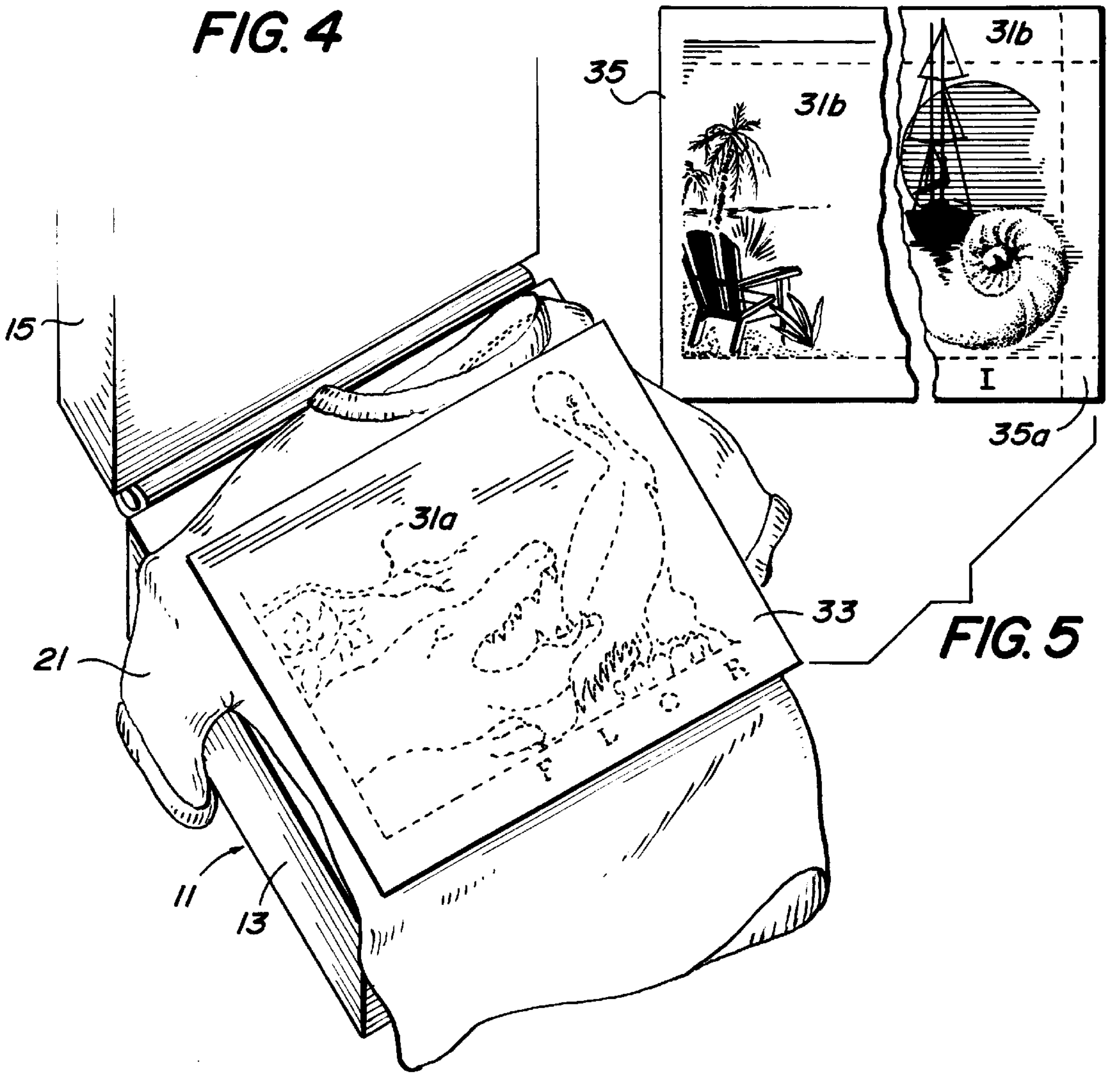
FIG. 5 is an isometric view of sheet A of the transfer sheet and the pictorial representation of FIGS. 3 and 4 applied initially to a garment within a conventional transfer press.

FIG. 5 is an isometric view of the surface of a press 11 in which a clothing article or product 21 has been laid flat upon the surface of the press and transfer sheet 33 has been applied to the surface leaving the pictorial representation 31*a* upon the surface of the clothing product 21. Also shown beside the press is the second transfer sheet 35 ready to be turned over and applied to the other portion of the garment.

Figure 6:
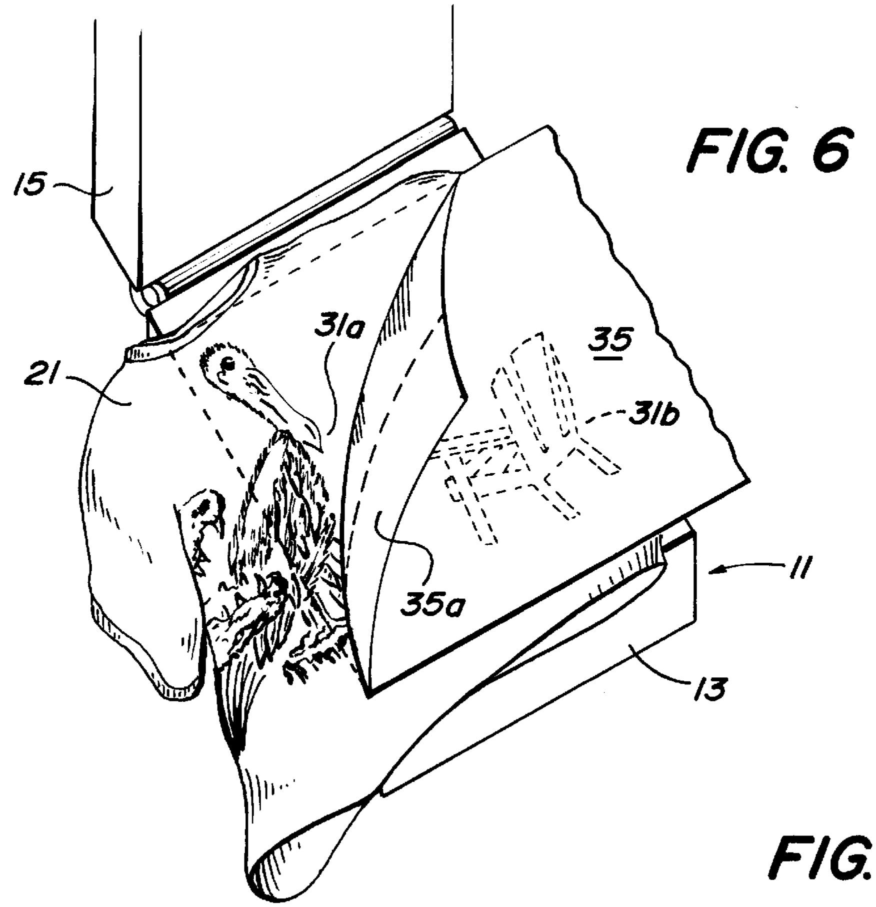
FIG. 6 is an isometric view of sheet B of the transfer with the pictorial representation on the far side just about to be applied to the garment adjacent to the portion of representation already applied to the garment showing the flap of the second transfer sheet extending partially over the first portion of the representation to protect it from smudging and other heat damage.

FIG. 6 is an isometric view of the press 11 as shown in FIG. 5 showing a transfer sheet part 35 placed upon the product 21 aligned with the first pictorialization upon the face of the product and with the flap 35*a* extending over the portion of the product upon which the first portion 31*a* of the pictorialization has already been applied. It will understood that the press or upper pivoted section of the press 55 will then be brought down upon the transfer sheet section and the product to transfer the visual image from the transfer sheet 35 to the product 21.

Figure 7:
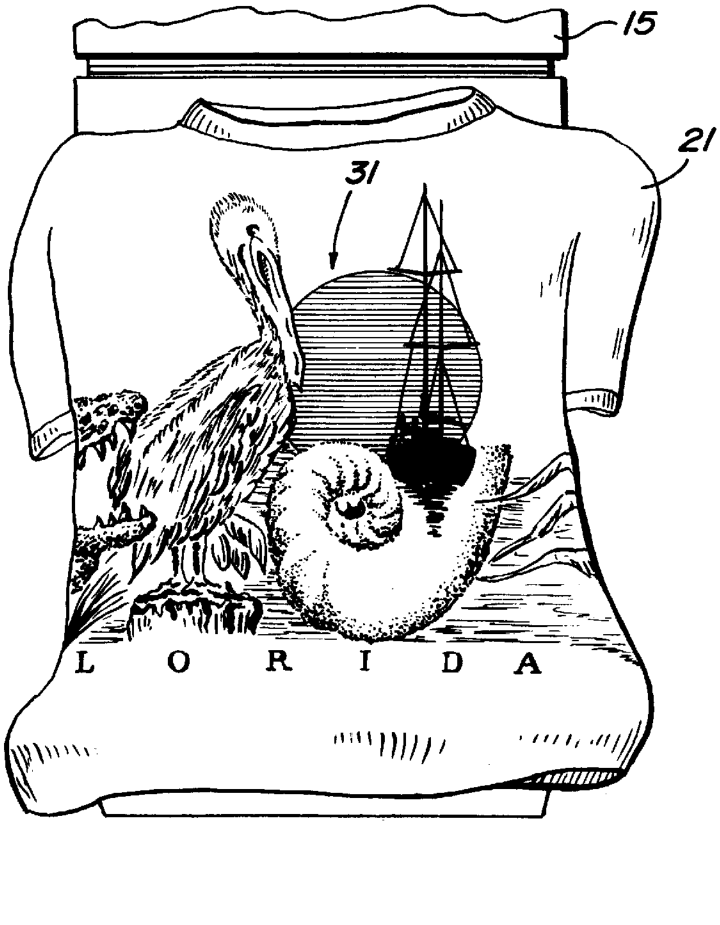
FIG. 7 is an isometric view of the garment still in the transfer press after the second transfer has been removed showing the completed second pictorialization applied in registration with the first on the garment.

FIG. 7 is a plan view of the front of the product having the second section of the pictorialization applied thereto and in a condition to be sold, but shown still remaining in the press.

It will recognized from the above description that various suitable pictorializations may be created for application to the transfer and segmented for application to two separate transfer sheet portions for consecutive application to a product. While in the illustration shown the entire transfer sheet may be translucent and may have in effect a flap all the way around, furthermore, it will be understood it is only the second transfer sheet which is actually required to be translucent or alternatively transparent and that such translucency or transparency can be only with respect to the flap of translucent material extending from the portion of the pictorialization which is to be secondly applied to the product. This is the only portion of the flap or transfer which actually needs to be translucent or transparent or which needs to have a flap 33*b*. Such flap 35*a* should be sufficiently wide to extend over the entire portion of the already applied pictorial representation already upon the fabric material which may be placed in the press for application of the second transfer sheet. In other words, if the product is placed in the press a second time and aligned or oriented in a position close to the edge of the press, the flap can be relatively narrow. However, if the orientation or positioning of the product already partially imprinted with the transferred pictorialization is fairly near the center of the press , then the flap 33*b* on the side of the second transfer sheet portion 29 must be sufficiently wide to cover the entire portion of the originally applied pictorialization without exposing such pictorialization to the unprotected top heating section of the press. It will also be understood that the thickness and insulating properties of the flap 35*a* must be adapted to the ink or coloring material used in the pictorialization, since the time that the material is to be in the press is dependent somewhat upon the ink or coloring material used and if such time is to be fairly high in order to properly activate the ink or coloring material, then the heat insulating properties of the flap must usually be more in order to prevent damage to the already applied surface. In most cases, therefore, it will satisfactory to have a flap of the same material as the main portion of the transfer sheet extending out over the adjacent image already applied in order to protect such image. However, it will be understood that if the time the material spends in the press and the heat of the press is considerable, then thicker insulative flaps may be necessary, while if the coloring or ink material which is being used is very quick acting and does not require high temperature, then the flap may be relatively thinner even than the transfer material itself. In most cases, it will be most convenient, however, to provide a flap of the same thickness as the main portion of the transfer material in to avoid complications in production and fabrication.

It will also be recognized that as explained above that while it is necessary only that the flap of the second transfer to be applied need be present to protect the surface, and the second flap need only be the only flap which is translucent or transparent, it will convenient in many cases to provide a corresponding flap on both sides of the segmentation line on both transfer sheets so that the order of transfer is not critical and either sheet can be used on the garment first. It will also be recognized that while only the flaps need be translucent, it may well be convenient to make the whole transfer sheet from translucent material or in those cases where a transparent material is readily available, from a transparent material, simply as a matter of design and materials usage and convenience.

It will be recognized from the above that the present applicant has discovered a very valuable procedure and apparatus for applying so-called "seamless" or "wrap around" designs to clothing material such as T-shirts and sweat shirts and the like. While the invention is relatively simple and practical, it has provided a solution to a long standing and pervasive problem and allows small shops selling pictorialized T-shirts, sweat shirts and other garments to compete successfully with larger establishments which may be able to keep a large inventory of already produced decorative garments. Consequently, the invention is particularly important for small shops and the like, although it may also be used by large establishments in order to make their operations more flexible and decrease the inventory which they may otherwise have to carry. The invention is easy for unskilled persons to make use of and provides startling results including wide designs with no detectable seam where two designs have been merged together after consecutive applications to a fabric article.

While the present invention has been described at some length and with some particularity with respect to several described embodiments, it is not intended that it be limited to any such particular embodiments or any particular embodiment, but is to be construed broadly with reference to the appended claims so as to provide the broadest possible interpretation of such claims in view of the prior art and therefore effectively to encompass the intended scope of the invention.

I claim:

1. A transfer sheet means for transferring a wrap-around pictorial design representation to the surface of fabric materials comprising:

(a) a first transfer sheet having a first portion of a pictorial design pattern arranged upon its surface for transfer to a fabric surface, (b) a second transfer sheet having a second matching portion of said pictorial design pattern arranged upon its surface for transfer to the same fabric surface, (c) the matching edges of the first and second pictorial design patterns being arranged to abut along a design intersection having a minimum of straight sections and designed to pass along a plurality of peripheral paths closely corresponding to elements of the pictorial design representation, and, (d) at least one partially transparent flap extending from the edge of the pictorial design representation, said flap having sufficient thickness to serve as a heat shield when extending over an already applied pictorial representation on fabric and prevent heat damage to said representation while applying heat to the matching pictorial pattern.

2. An arrangement for transferring a wrap-around design representation of a complicated nature to an article of clothing by means of a transfer sheet applied to the clothing in a heat press having a smaller area than a design representation to be applied to said article of clothing comprising:

(a) a first transfer sheet having a first portion of a design pattern arranged upon its surface for transfer to an article of clothing,, said first portion of the design pattern having an area not greater than the area of the pressing surface of said heat press, (b) a second transfer sheet having a second portion of the design pattern arranged upon its surfaces for transfer to the same article of clothing, (c) the matching edges of the first and second portions of the design pattern being arranged to abut along a design intersection having a minimum of straight sections and arranged and designed to pass along a plurality of peripheral paths closely corresponding to elements of the pictorial design representation, and (d) at least one partially transparent flap extending from the edge of the design pattern, said flap having sufficient thickness to serve as an heat shield when extending over an already applied portion of the design pattern on an article of clothing and prevent heat damage to said representation while applying heat and pressure to the matching design representation upon the article of clothing.

3. An apparatus in accordance with claim 2 wherein the design representation is a pictorial design representation.

4. A transfer sheet assembly for transferring a wrap-around design representation to the surface of an article of clothing comprising:

(a) a first transfer sheet having a first portion of a transferable design representation on its surface arranged and constructed for pressure contact while heated to a discrete fabric item held upon the pressing surface of a heated press, (b) a second transfer sheet having a second matching portion of said design representation arranged on its surface and constructed for pressure contact while heated to said discrete fabric item abutting the first transferred portion of the design item while held upon the pressing surface of the heated press, (c) the matching edges of the first and second design patterns being arranged to abut along a design intersection having a minimum of straight sections and arranged and designed to pass along a plurality of peripheral paths closely corresponding to elements of the design representation, and, (d) at least one transparent flap extending from the edge of the pictorial design representation, said flap having sufficient thickness to serve as a heat shield when extending over an already applied portion of the pictorial representation of the discrete fabric item and prevent heat damage to said already applied portion of the design representation while applying heat to the matching design representation.

5. A transfer sheet assembly in accordance with claim 4 wherein the design representation is a pictorial design representation.

* * * * *